United States Patent [19]

Nisimura

[11] Patent Number: 5,513,018
[45] Date of Patent: Apr. 30, 1996

[54] DIGITAL IMAGE FORMING APPARATUS HAVING A FUNCTION OF COMPENSATING SHADINGS USING A WHITE REFERENCE PLATE

[75] Inventor: Hiroyuki Nisimura, Tokyo, Japan

[73] Assignee: Kabushiki Kaisha Toshiba, Kawasaki, Japan

[21] Appl. No.: 36,326

[22] Filed: Mar. 24, 1993

[30] Foreign Application Priority Data

Sep. 14, 1992 [JP] Japan .................................. 4-244717

[51] Int. Cl.$^6$ .............................. H04N 1/00; H04N 1/04; G06K 9/00
[52] U.S. Cl. ........................ 358/474; 358/296; 358/406; 382/319
[58] Field of Search ..................................... 358/296, 298, 358/406, 471, 474, 480–483, 486, 497, 504, 505, 509, 510, 513, 514; 382/50, 52, 53, 58, 62, 63, 270–273, 312, 318, 319; 355/202, 204, 208

[56] References Cited

U.S. PATENT DOCUMENTS

| | | | |
|---|---|---|---|
| 4,383,275 | 5/1983 | Sasaki et al. | 382/65 X |
| 4,573,787 | 3/1986 | Sanbayashi et al. | 355/14 |
| 4,679,073 | 7/1987 | Hayashi | 358/80 |
| 4,760,464 | 7/1988 | Sakano | 358/282 |
| 4,952,972 | 8/1990 | Someya | 358/475 X |
| 5,014,332 | 5/1991 | Nakajima et al. | 382/50 |
| 5,107,344 | 4/1992 | Nosaki et al. | 358/497 |
| 5,153,745 | 10/1992 | Brandkamp et al. | 358/406 |
| 5,282,053 | 1/1994 | Robideau | 358/406 |
| 5,307,182 | 4/1994 | Maltz | 358/504 X |

FOREIGN PATENT DOCUMENTS 4020817  1/1991  Germany .......................... H04N 1/38

OTHER PUBLICATIONS

Patent Abstracts of Japan, vol. 16, No. 542 (E–1290) 12 Nov. 1992 & JP–A–42 07 257 (Fuji Xerox Co. Ltd) 29 Jul. 1992 *abstract*.
Patent Abstracts of Japan, vol. 13, No. 18 (E–704)17 Jan. 1989 & JP–A–63 224 (Canon Inc) 19 Sep. 1988 *abstract*.

Primary Examiner—Peter S. Wong
Assistant Examiner—Eric Frahm
Attorney, Agent, or Firm—Limbach & Limbach

[57]  ABSTRACT

In a digital color copying machine that includes a control unit for automatically controlling the proper light amount of an exposure lamp, data denoting a light amount of the lamp used in the preceding copying is stored in a CPU, and a white reference plate is scanned with light from the lamp to obtain updated data which is stored in a RAM and a maximum value is calculated by an ALU. The maximum value thus calculated and a reference value are compared with each other by a comparator. Only when the maximum value is out of a range of the reference value, the light amount of the illumination lamp is changed by controlling a lamp driver. Thus, an optimum light amount of the lamp can be set in a short period of time and preparation time for copying can be reduced.

12 Claims, 4 Drawing Sheets

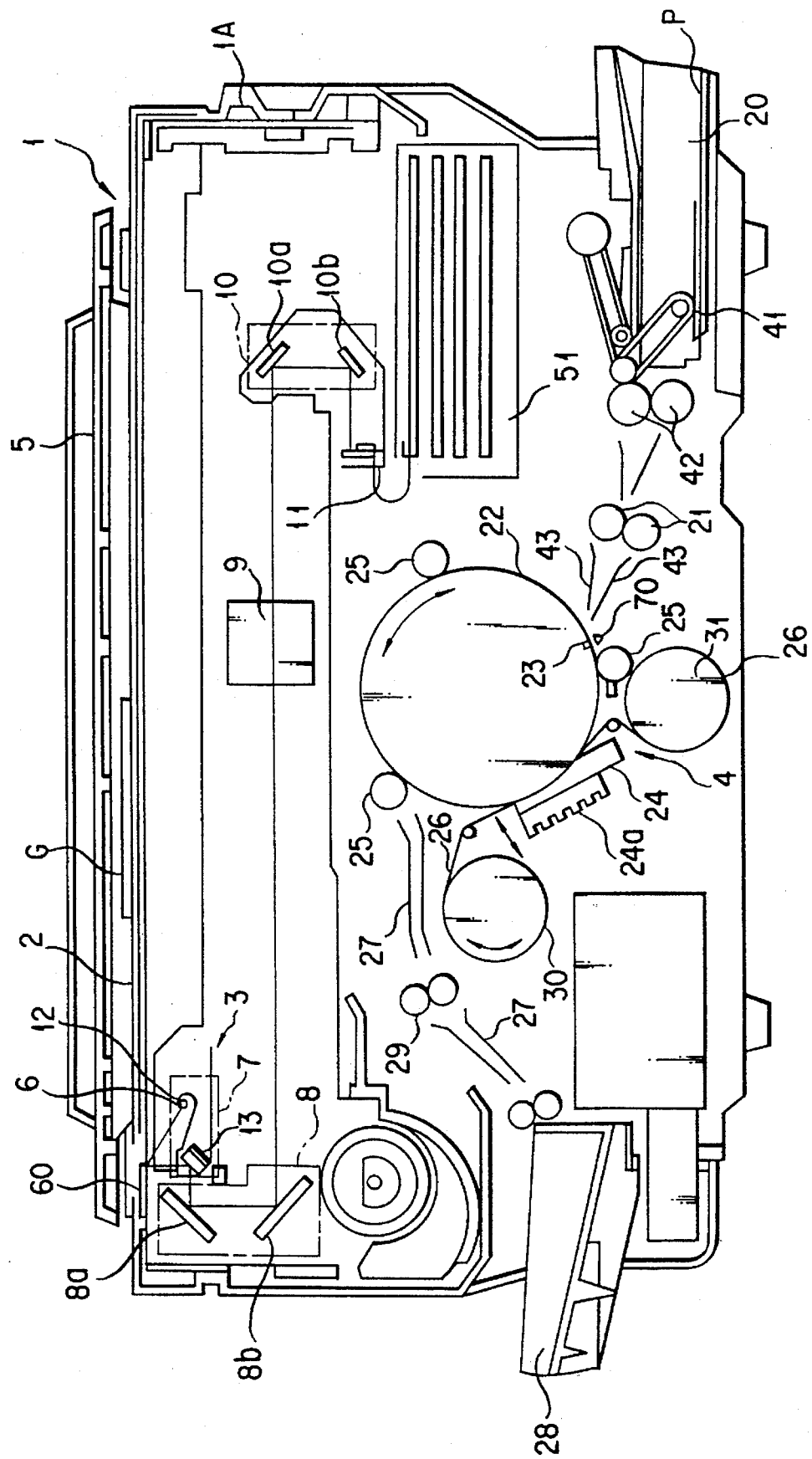
F I G. 1

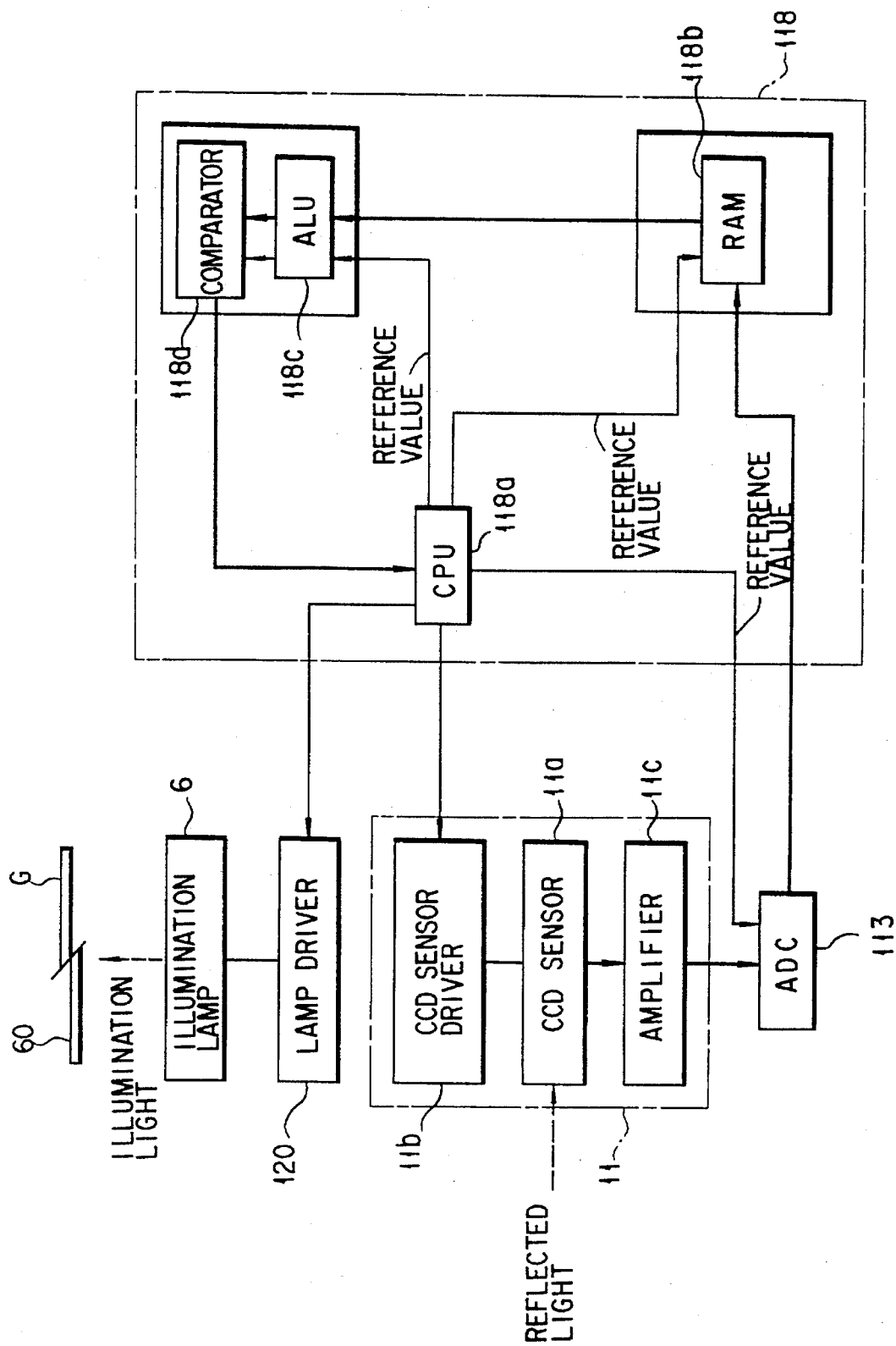
F I G. 3

DIGITAL IMAGE FORMING APPARATUS HAVING A FUNCTION OF COMPENSATING SHADINGS USING A WHITE REFERENCE PLATE

BACKGROUND OF THE INVENTION

1. Field of the Invention

The present invention relates to an image forming apparatus such as a digital copying machine that reads an image in the unit of dots to copy the image on a paper.

2. Description of the Related Art

In conventional image forming apparatus, such as a digital copying machine, an object to be copied (an original) is illuminated with an exposure lamp. Then, a reflected light is converted electrically into an analog image signal by a photoelectric converting unit such as a CCD (charge-coupled device) sensor or the like. This analog image signal is A/D (analog-to-digital)-converted into digital image data. Thereafter, such digital image data is processed in various processes, thereby an image being formed. There is a proper light amount of an exposure lamp in the process for forming an image. The light amount of exposure lamp is fluctuated due to an aging change of the exposure lamp or the like. When the light amount of exposure lamp is not proper or when the light amount is too large, i.e., too bright, an image signal is overflowed. When the light amount is too small, i.e., too dark, a resolution is lowered so that the quality of picture to be formed is deteriorated considerably. The light amount of the exposure lamp can be controlled by changing the magnitude of a voltage applied to the exposure lamp. That is, a reference voltage that determines a range of A/D conversion is set in an A/D converter. Therefore, an input analog image signal must be adjusted so as not to exceed such range. Generally, in a digital copying machine, the analog image signal is adjusted such that, each time the copying is carried out, a white reference plate is read out by sequentially increasing the light amount of exposure lamp and an optimum light amount is selected on the basis of the resultant read data. For example, the 8-bit A/D converter whose reference voltage is 0 V and 5 V divides 0 to 5 V by 256. Thus, when the analog image signal input to an amplifier is in a range of from 0 to 4 V, the light amount of the exposure lamp is increased so that the analog image signal becomes 5 V. Therefore, the analog image signal is adjusted to be suitable for the reference voltage.

However, when the analog image signal is adjusted such that, each time the copying is carried out, the white reference plate is read by sequentially increasing the light amount of exposure lamp and then the optimum light amounts selected, then the light amounts that can be set in every copying operation are all canceled and then the white reference plate is read. There is then the drawback that a standby time for starting the copying operation is unavoidably increased.

SUMMARY OF THE INVENTION

It is an object of the present invention to provide an image forming apparatus in which an optimum light amount of an exposure lamp can be set in a short period of time and a standby time for starting the copying operation can be reduced.

According to an aspect of the present invention, there is provided an image scanning apparatus, comprising: means for illuminating to scan target areas; means for producing image signals representative of the shade of darkness of areas being illuminated by the illuminating means, the target areas including a reference area of predetermined shade of darkness; a first adjusting means for adjusting a light quantity of the illuminating means on the basis of the image signal corresponding to the reference area so that the light quantity is in a proper light quantity in a first illumination of the illuminating means; means for storing a data representative of the light quantity adjusted by the adjusting means; and a second adjusting means for adjusting the light quantity of the illuminating means on the basis of the image signal corresponding to the reference area and the data stored by the storing means so that the light quantity is in a proper light quantity in a second illumination of the illuminating means following the first illumination.

According to another aspect of the present invention, there is provided an image forming apparatus, comprising: means for illuminating to scan target areas; means for producing image signals representative of the shade of darkness of areas being illuminated by the illuminating means, the target areas including a reference area of predetermined shade of darkness; a first adjusting means for adjusting a light quantity of the illuminating means on the basis of the image signal corresponding to the reference area so that the light quantity is in a proper light quantity in a first illumination of the illuminating means; means for storing a data representative of the light quantity adjusted by the adjusting means; a second adjusting means for adjusting the light quantity of the illuminating means on the basis of the image signal corresponding to the reference area and the data stored by the storing means so that the light quantity is in a proper light quantity in a second illumination of the illuminating means following the first illumination; and means for forming an image on the basis of the image signals.

According to still another aspect of the present invention, there is provided an image forming apparatus comprising: means for illuminating to scanning an original with illumination of a light; means for producing an image signal by photoelectrically converting a reflected light from the original by the illumination of the illumination means; means for converting the image signal generated by means for forming an image on the basis of a digital image signal; means for adjusting a light quantity of the illuminating means to be a predetermined value before the original is scanned, and reading a reference material having a certain refection factor with the predetermined light quantity of the illuminating means; first storing means for storing data read by the adjusting means; means for comparing the data stored in the first storing means with a reference voltage; means for adjusting a scanning light quantity of the illuminating means in response to a compared result of the comparing means; storing means for storing the scanning light quantity provided when the illuminating means is adjusted by the adjusting means; and means for causing the adjusting means to read the reference material with the scanning light amount of the illuminating means stored in the second storing means, causing the comparing means to compare the read data with the reference voltage, and causing the adjusting means to adjust the scanning amount of the illuminating means.

In the present invention, since the image forming apparatus includes means for automatically adjusting a light amount of a lamp and the light amount provided when the exposure is made before is stored, the useless scanning of the white reference plate can be eliminated without scanning fully the light amount to be set in each copying. Therefore, the proper light amount can be set efficiently in a short period of time stably.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention. Like reference numerals are used to identify the same or similar parts in the several views.

FIG. 1 is a sectional view showing schematically an interior of a digital color copying machine according to an embodiment of the present invention;

FIG. 3 is a block diagram showing a pertinent portion of a circuit arrangement that controls a light amount of an illumination lamp shown in FIG. 1.

DETAILED DESCRIPTION OF THE PREFERRED EMBODIMENT

Figure 2:
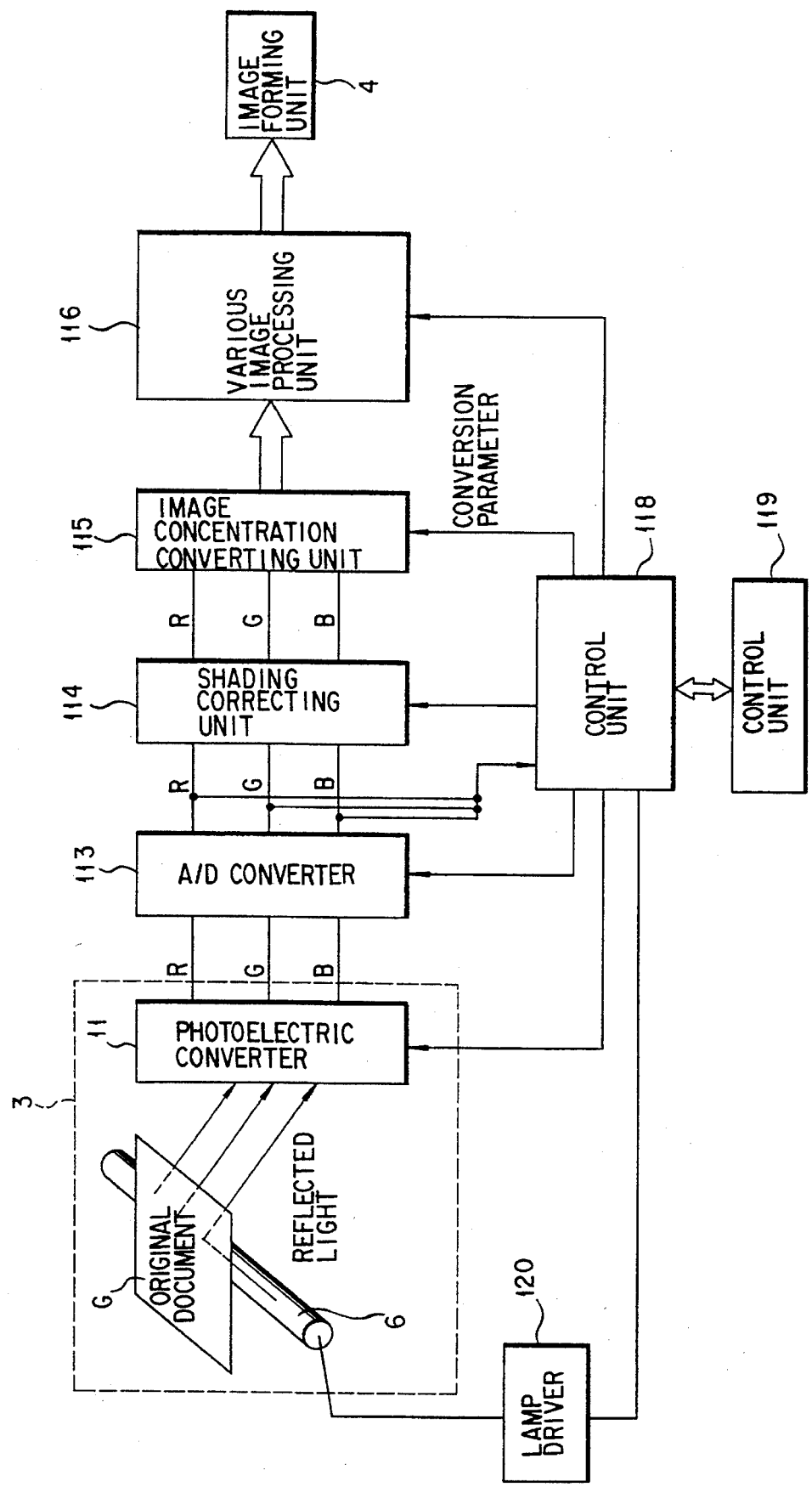
FIG. 2 is a block diagram showing a control circuit of a digital color copying machine shown in FIG. 1.

An image forming apparatus according to an embodiment of the present invention will be described hereinafter with reference to the drawings.

FIG. 1 is a sectional diagram showing schematically an overall arrangement of a digital color copying machine according to the present invention. In FIG. 1, a digital color copying machine 1 includes an apparatus main body 1A of a box-like configuration. On the upper portion of the apparatus main body 1A, there is provided a scanner unit 3 that reads an image information on an original G set on an original holder 2 made of a transparent glass by scanning the original G. An image forming unit 4 is provided on the lower portion of the apparatus body 1A. In FIG. 1, reference numeral 5 denotes an original cover that is provided on the original holder 2 so as to become freely openable and closable. Reference numeral 60 designates a white reference plate provided near the original holder 2. The scanner unit 3 comprises a first carriage 7 in which there are disposed an illumination lamp (exposure) lamp 6 serving as a light source, etc.; a second carriage 8 that refracts an optical path by a mirror; a zoom lens 9; a mirror unit 10 which corrects an optical path length in zooming mode and introduces a reflected light from the original G into a photoelectric converter (e.g., CCD sensor) serving as an image sensor; the photoelectric converter 11 for sensing the reflected light from the original G; and a driving system (not shown) for varying the positions of the above respective portions. The first carriage 7 includes an illumination lamp 6 for illuminating the original G with a light; a reflector 12 serving as a reflection mirror for converging a light from the illumination lamp 6 on the original G; and a mirror 13 for leading the reflected light from the original G into the second carriage 8. The second carriage 8 has mirrors 8a, 8b mounted thereon that lead a light introduced by the mirror 13 into the zoom lens 9. The mirror unit 10 comprises two mirrors 10a, 10b. The photoelectric converter 11 photoelectrically converts the reflected light from the original G to separate an image on the original G into color light signal of cyan (C), green (G), yellow (Y) (or red (R), green (G), blue (B)) and to output the same. In this case, one pixel of the original G corresponds to three consecutive elements (C, G, Y) of the CCD sensor. An output of the photoelectric converter 11 is output to an A/D converter (ADC), which will be described later, provided in an electrically equipped portion 51 that is used to process an electrically-signalized image information, i.e., analog image signals. The mirrors 10a and 10b and the zoom lens 9 are moved by independent step motors (not shown), respectively. The zoom lens 9 is rotated by a corresponding step motor and moved in the direction of the optical axis according to the movement of a spiral shaft (not shown). The image forming unit 4 has a platen drum 22 located at an approximately central portion of the apparatus main body 1A. The platen drum 22 is made of an elastic material such as rubber at its periphery and serves as a platen roller for the thermal head 24. The platen drum 22 rotates clockwise to wind the paper P serving as an image forming medium on it and overlap the paper P so that the paper P is not dislocated in printing. A pressure roller 25 is provided near the platen drum 22 at predetermined intervals so that the paper P does not separate from the platen drum 22. The circumference of the platen drum 22 is slightly longer than the longitudinal length of the largest size of the paper P. The thermal head 24 is set in a lower left position to the platen drum 22. The thermal head 24 is installed on a radiator 24a integrally formed on the rear end face of a holder. An ink ribbon 26 wound on rollers 30 and 31 is set between the platen drum 22 and the thermal head 24. A paper feeding roller 41 is set at the bottom of the apparatus main body 1A so that the papers P can be taken out of a paper feeding cassette 20 one by one. In this case, the paper feeding cassette 20 can be taken out of the side of the apparatus main body 1A. The paper P taken out by the feeding roller 41 is transferred by a carrying roller 42 to a resist roller 21 disposed in the upper left direction of the carry roller 42 and the top of the paper P is aligned. Thereafter, the paper P is transferred to the platen drum 22 by the resist roller 21 through a guide 43. The top of the paper P is held by a gripper 23 attached to the platen drum 22, thereby being wound around the peripheral portion of the platen drum 22. On the frame of the apparatus main body 1A, there is provided a gripper releasing nail 70 in association with the transferring portion that transfers the paper P to the platen drum 22. This gripper releasing nail 70 is engaged with the gripper 23 when the platen drum 22 is rotated in the clockwise direction. The paper P fixed at its top by the gripper 23 is wound around the platen drum 22. After the top thereof is passed through the printing area, the thermal head 24 is urged against the platen drum 22, thereby the printing is carried out. In FIG. 1, reference numeral 27 depicts a paper eject guide, 28 a paper eject tray and 29 a remelting roller.

FIG. 2 is a block diagram showing a control circuit of the digital color copying machine 1. In this digital color copying machine 1, image signals of predetermined colors are processed in a digital fashion. The control circuit comprises an A/D converting unit 113 formed of an A/D converter for converting an analog image signal, i.e., video information serving as a color signal which is photoelectrically-converted by the photoelectric converter 11 to a digital signal; a shading correcting unit 114 for correcting a shade of the image signal i.e., digital image data processed by the A/D converting unit 113; an image concentration converting unit 115 for converting a concentration of the image in response to a command from a control unit 118; an image processing unit 116 for performing various processes such as enlargement, reduction or the like in accordance with operation contents in an operation panel 119 operated by the operator; a control unit 118 for controlling the whole of the copying machine 1; and a lamp driver 120 for driving the illumination lamp 6. The control circuit is incorporated in the electrically equipped unit 51 shown in FIG. 1. On the basis of the process result of the electrical processes by the control circuit in the electrically equipped unit 51, the image is formed by the image forming unit 4. For example, the paper P in the feeding cassette 20 is taken out one by one by the feeding roller 41 and carried by the carriage roller 42 to the resist roller 21 disposed in an upper left position, whereby the top of the paper P is aligned. Thereafter, the paper P is transferred by the resist roller 21 to the platen drum 22 through the guide 43 and then wrapped around the platen drum 22 by the gripper 23 attached to the platen drum 22. On the basis of the image signal processed at every color described above, the proper ink ribbon 26 is heated by the thermal head 24 disposed in a lower left position with respect to the platen drum 22. Thereby an image is printed on the paper P. These operations are repeated at every color and inks of respective colors are overlapped, whereby a color image is formed. The paper P thus printed is ejected by the remelting roller 29 on the eject tray 28 through the eject guide 27.

FIG. 3 is a block diagram showing a pertinent portion of the arrangement of the light amount control of the illumination lamp 6. The light amount control of the illumination lamp 6 in this digital color copying machine 1 will be described with reference to FIG. 3. The light amount control of the illumination lamp 6 is to optimize the analog image signal input into the A/D converting unit 113 when the command of copy start is input. The light amount control circuit comprises a control unit 118 formed of a central processing unit (CPU) 118a, a random access memory (RAM) 118b, an arithmetic and logic unit (ALU) 118c, and a comparator 118d; a photoelectric converter 11 formed of a charge-coupled device (CCD) sensor 11a, a CCD sensor driver 11b and an amplifier (AMP) 11c; an A/D converting unit 113; an illumination lamp 6; and a lamp driver 120. A reference voltage is in advance supplied to the ADC 113, the ALU 118c, the comparator 118d and the RAM 118b. The light amount control in this case is carried out as follows. Prior to each copying, the white reference plate 60 is scanned with the previously-set light amount of the illumination lamp 6, and data of several lines corresponding to a reflected light is read by the CCD sensor 11a. The original G, the original table 2 and the white reference plate 60 correspond to a target area. The read data is converted into digital data by the ADC 113 and then stored in the RAM 118b. The maximum average value of the digital data thus read is calculated by the ALU 118c. Then, the calculated maximum value and the reference voltage supplied from the A/D converting unit 113 are compared by the comparator 118d and the compared result is supplied to the CPU 118a. When the compared result does not satisfy a predetermined condition, a command for changing the light amount of the illumination lamp 6 is output from the CPU 118a to the lamp driver 120. For example, when the A/D converting unit 113 has reference voltages between 0 V and 5 V and divides the voltages between 0 V and 5 V by 256 in 8 bits, then the light amount of the illumination lamp 6 is increased so that the maximum average value of the read data input by the amplifier 11c falls within a range of 4 to 5 V. Such operation is repeated so that the optimum light amount of the illumination lamp 6 is determined as an illumination light. Then, the original G is read by the optimum light amount thus determined of the illumination lamp 6, whereby the image is constantly formed stably.

Figure 4:
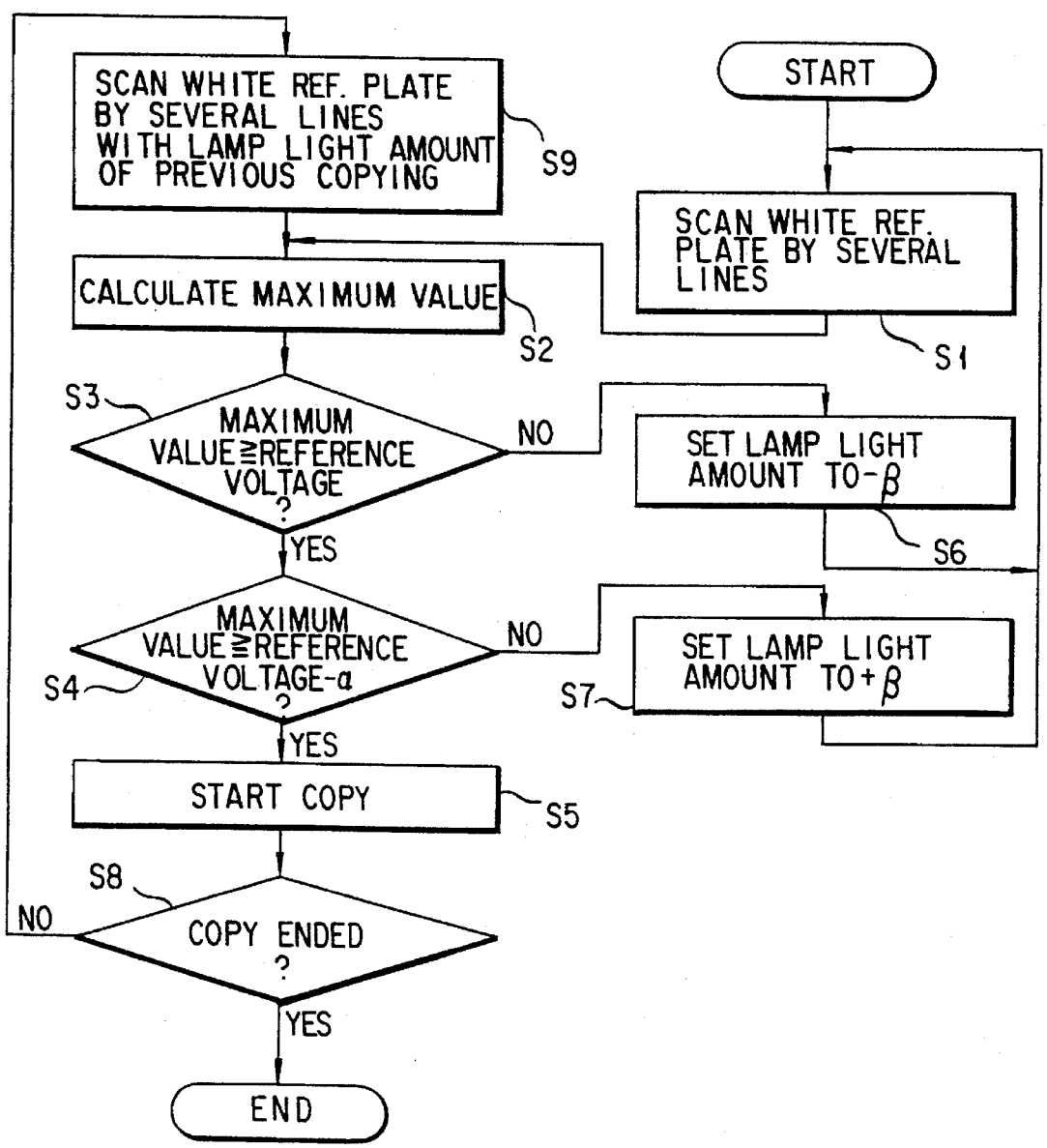
FIG. 4 is a flowchart showing the flow of processes concerning the light amount control of the illumination lamp shown in FIG. 3.

FIG. 4 is a flowchart showing the flow of processes concerning the light amount control of the illumination lamp 6 in FIG. 3. Operation of the arrangement shown in FIG. 3 will be described next. Initially, the start button for commanding the copy start on the operation panel 119 is depressed by the operation of the operator. Then, the analog image signal input to the ADC 113 is optimized by the scanner unit 3. That is, the white reference plate 60 is scanned several lines while changing the light amount of the illumination lamp 6 in several kinds (step S1). Then, it is checked by the control unit 118 what amount of light provides the maximum average value of the read data that may fall within a predetermined set range (step S2). In this embodiment, the upper limit of the set range is selected to be the reference voltage to the ADC 113 and the lower limit is selected to be $-\alpha$ of the reference voltage. Also, the amount of light illuminated on the first sheet of the original G from the illumination lamp 6 is set in advance. In case the maximum value at that time is within the above set range (maximum value $\leq$ reference voltage and maximum value $\geq$ reference voltage $-\alpha$) (steps S3, S4), the amount of light radiated on the first sheet of the original G is determined therein. With such light amount of the illumination lamp 6, the copying operation on the first sheet of the original G is executed (step S5). While, if the maximum value is larger than the upper limit of the reference voltage (step S6), the setting step of the light amount of the lamp is increased by $-\beta$, and then the process after the scanning process of the white reference plate 60 is repeated. Conversely, if the maximum value is smaller than the lower limit of the reference voltage (step S7), then the setting step of the light amount of the lamp is decreased by $+\beta$. Then, the process after the scanning process of the white reference plate 60 is repeated. 10 As described above, only when the maximum value is out of the above setting range, the lamp light amount is changed and the copying operation is carried out with a light amount of the lamp so that the maximum value falls within the set range. The variables $\alpha$ and $\beta$ can be changed with ease by the control unit 118. The light amount at that time is stored in a memory provided within the CPU 118a, for example. The stored light amount is used to control the light amount in the copying operation of a second sheet of the original G and thereafter. For example, in the copying operation in the second sheet and following sheets of the original G, the white reference plate 60 is read with the light amount of the lamp used in the preceding copying operation (step S9). If the maximum value at that time is within the set range (steps S3, S4), the copying operation is executed with such light amount (step S5). That is, the control unit 118 determines the scanning light amount to be a proper light amount when a maximum value of average read data provided when the white reference plate 60 is scanned by the stored scanning light amount falls within a set range between a predetermined upper limit reference voltage and a lower limit reference voltage range, and does not change the scanning light amount. If not (steps S6, S7), after the light amount is changed so as to fall within the set range (steps S1, S2, S3, S4), the copying operation is executed (step S5). For example, the control unit 118 reduces the scanning light amount in response to a difference so that the scanning light amount falls within a set range when a maximum value of average read data provided when the white reference plate 60 is scanned by the stored scanning light amount is larger than said predetermined upper limit reference voltage. On the other hand, the control unit 118 increases the scanning light amount in response to a difference so that the scanning light amount falls within a set range when a maximum value of average read data provided when the white reference plate 60 is scanned by the stored scanning light amount is smaller than the predetermined lower limit reference voltage. If the copying of a predetermined number of sheets is completed, then the copying operation is terminated (step S8). If the above light amount control is carried out before each original G is copied, then the fluctuation of light amount for each original G can be alleviated. Also, the stable image forming that can be prevented from being affected by the decrease of light amount due to the aging change or the like can be realized. As described above, without scanning fully the light, the useless scanning of the white reference plate by the light can be eliminated amount to be set in each copying. That is, in order that the analog image signal that is to be A/D-converted is adjusted to be suitable for the reference voltage of the A/D converter, a white shading value is read with the light amount of the lamp used in the previous copying operation. Then, only when this value is different from the previous read value, the light amount of the lamp is changed. Thus, when the optimum light amount is determined, without reading the white shading values with respect to all setting steps, the light amount of the lamp can be adjusted on the basis of the preceding light amount of the lamp. Therefore, the useful and efficient light amount control becomes possible. Accordingly, the stable setting can be carried out in a short period of time with less fatigue of lamp. While the analog image signal is adjusted by changing the light amount as described above, the present invention is not limited thereto and a reference adjustment for changing an amplification factor of amplifier may be carried out altogether. In this case, the disadvantages that cannot be compensated for by the change of light amount of the lamp can be covered.

What is claimed is:

1. An image scanning apparatus, comprising:

means for sequentially illuminating target areas while scanning said target areas;

means for producing an image signal representative of the shade of darkness of areas obtained by sequentially illuminating the areas by said illuminating means during a first illumination, the target areas including a reference area of predetermined shade of darkness and an area of an original to be read;

means for setting a light quantity of the illuminating means on the basis of the image signal corresponding to the reference area so that said light quantity is in a proper light quantity during said first illumination of said illuminating means;

means for storing sequential data representative of the light quantity obtained by said sequentially illuminating means;

means for comparing present light quantity data with previous light quantity data stored in said storing means to obtain a difference between said present data and said previous data; and means for adjusting the light quantity of the illuminating means after a second illumination of said illuminating means such that said light quantity, when said difference falls within a set range, remains the same and said light quantity is only changed to a proper light quantity by illuminating said reference area by said illuminating means when said difference is out of said set range.

2. The image scanning apparatus according to claim 1, wherein said adjusting means determines said light quantity to be the proper light quantity when a maximum of average values of image data obtained by scanning said reference area using an illumination light corresponding to said set proper light quantity falls within a set range between a predetermined upper limit reference voltage and a lower limit reference voltage range, thereby maintaining said light quantity of said illuminating means.

3. The image scanning apparatus according to claim 1, wherein said adjusting means reduces the light quantity when a maximum of average values of image data obtained by scanning said reference area using an illumination light corresponding to said set proper light quantity is larger than said predetermined upper limit reference voltage.

4. The image scanning apparatus according to claim 1, wherein said adjusting means increases the light quantity when a maximum of average values of image data obtained by scanning said reference area using an illumination light corresponding to said set proper light quantity is smaller than said predetermined lower limit reference voltage.

5. An image forming apparatus, comprising:

means for sequentially illuminating target areas while scanning said target areas;

means for producing an image signal representative of the shade of darkness of areas obtained by sequentially illuminating the areas by said illuminating means starting with a first illumination, the target areas including a reference area of predetermined shade of darkness and an area of an original to be read;

means for setting a light quantity of the illuminating means on the basis of the present image signals corresponding to the reference area so that said light quantity is in a proper light quantity during said first illumination of said illuminating means;

means for storing sequential data representative of the image signals corresponding to light quantity previously obtained by said sequentially illuminating means;

means for comparing present image signals with previous image signals stored in said storing means to obtain a difference between said present image signals and said previous signals;

means for adjusting the light quantity of the illuminating means after a second illumination of said illuminating means such that said light quantity, when said difference falls within a set range, remains the same and is only changed to a proper light quantity by illuminating said reference area by said illuminating means when said difference is out of said set range; and means for forming an image on the basis of said image signals.

6. The image scanning apparatus according to claim 5, wherein said adjusting means determines said light quantity to be the proper light quantity when a maximum of average values of image data obtained by scanning said reference area using an illumination light corresponding to said set proper light quantity falls within a set range between a predetermined upper limit reference voltage and a lower limit reference voltage range, thereby maintaining said light quantity of said illuminating means.

7. The image scanning apparatus according to claim 5, wherein said adjusting means reduces the light quantity when a maximum of average values of image data obtained by scanning said reference area using an illumination light corresponding to said set proper light quantity is larger than said predetermined upper limit reference voltage.

8. The image scanning apparatus according to claim 5, wherein said adjusting means increases the light quantity when a maximum of average values of image data obtained by scanning said reference area using an illumination light corresponding to said set proper light quantity is smaller than said predetermined lower limit reference voltage.

9. An image reading apparatus comprising:

means for illuminating an original with light;

means for producing an image signal by photoelectrically converting reflected light from said original by said illuminating means;

means for converting said image signal into a digital image signal;

means for forming an image on the basis of the digital image signal;

first adjusting means for adjusting a light quantity of said illuminating means to be a predetermined value before said original is scanned, so as to read a reference material having a certain reflection factor with said light quantity of said illuminating means to obtain read data;

first storing means for storing the read data obtained by said first adjusting means;

means for comparing said read data stored in said first storing means with a reference value;

second adjusting means for adjusting the light quantity of said illuminating means in response to a compared result of said comparing means;

second storing means for storing said light quantity provided when said illuminating means is adjusted by said second adjusting means; and means for causing said second adjusting means to read said reference material with said light quantity of said illuminating means stored in said second storing means, causing said comparing means to compare said read data with said reference value, and causing said second adjusting means to adjust the light quantity of said illuminating means.

10. The apparatus according to claim 9, wherein said causing means determines said light quantity to be a proper light quantity when a maximum value of said read data falls within a set range between a predetermined upper limit reference value and a lower limit reference value.

11. The apparatus according to claim 10, wherein said causing means reduces the light quantity when a maximum value of said read data is larger than said predetermined upper limit reference value.

12. The according to claim 10, wherein said causing means increases the light quantity when a maximum value of said read data is smaller than said predetermined lower limit reference value.

* * * * *